Inventor
Samuel Davis Robins
by his Attorney

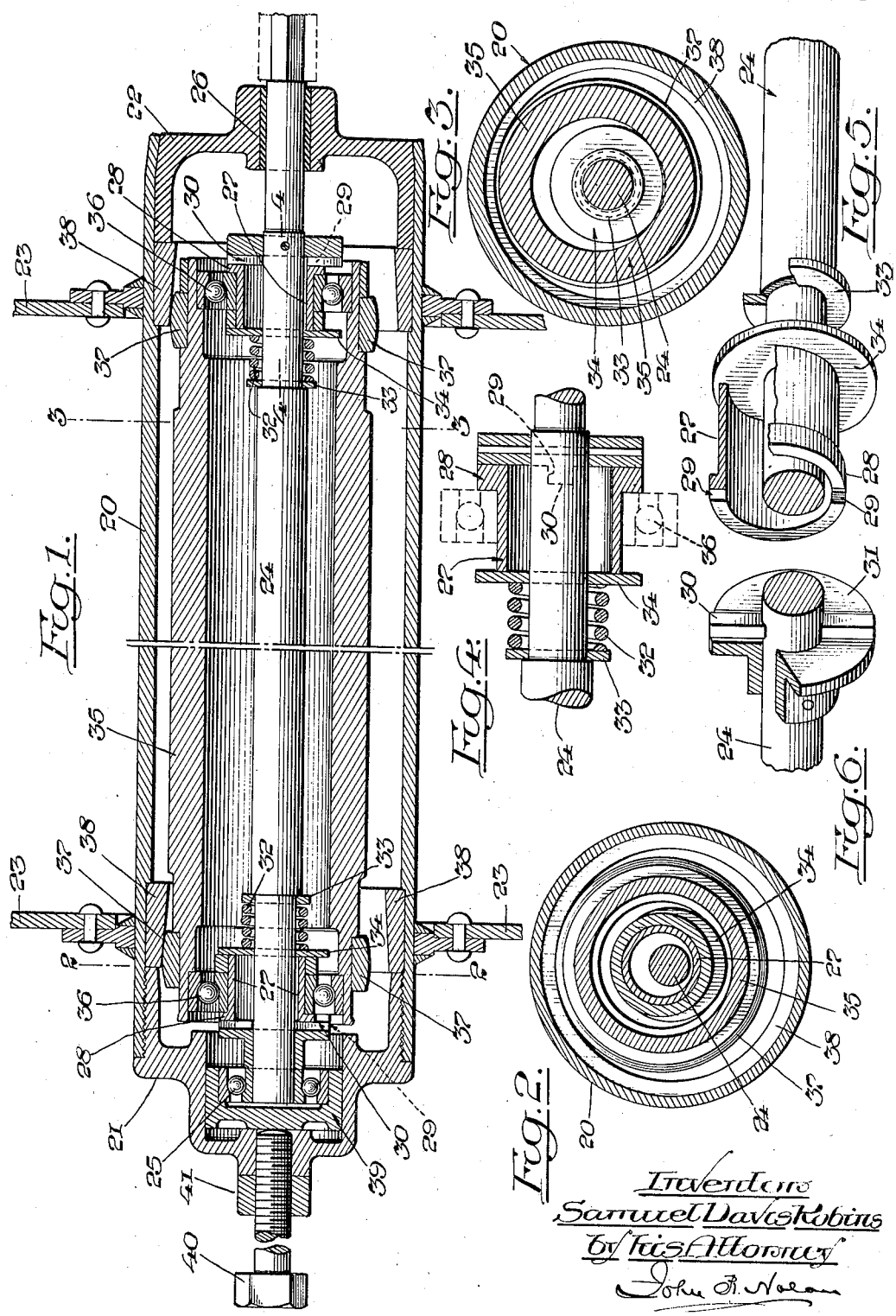

March 14, 1933.  S. D. ROBINS  1,901,122
VIBRATOR FOR SCREENS AND OTHER APPARATUS
Filed Jan. 6, 1932  3 Sheets-Sheet 3
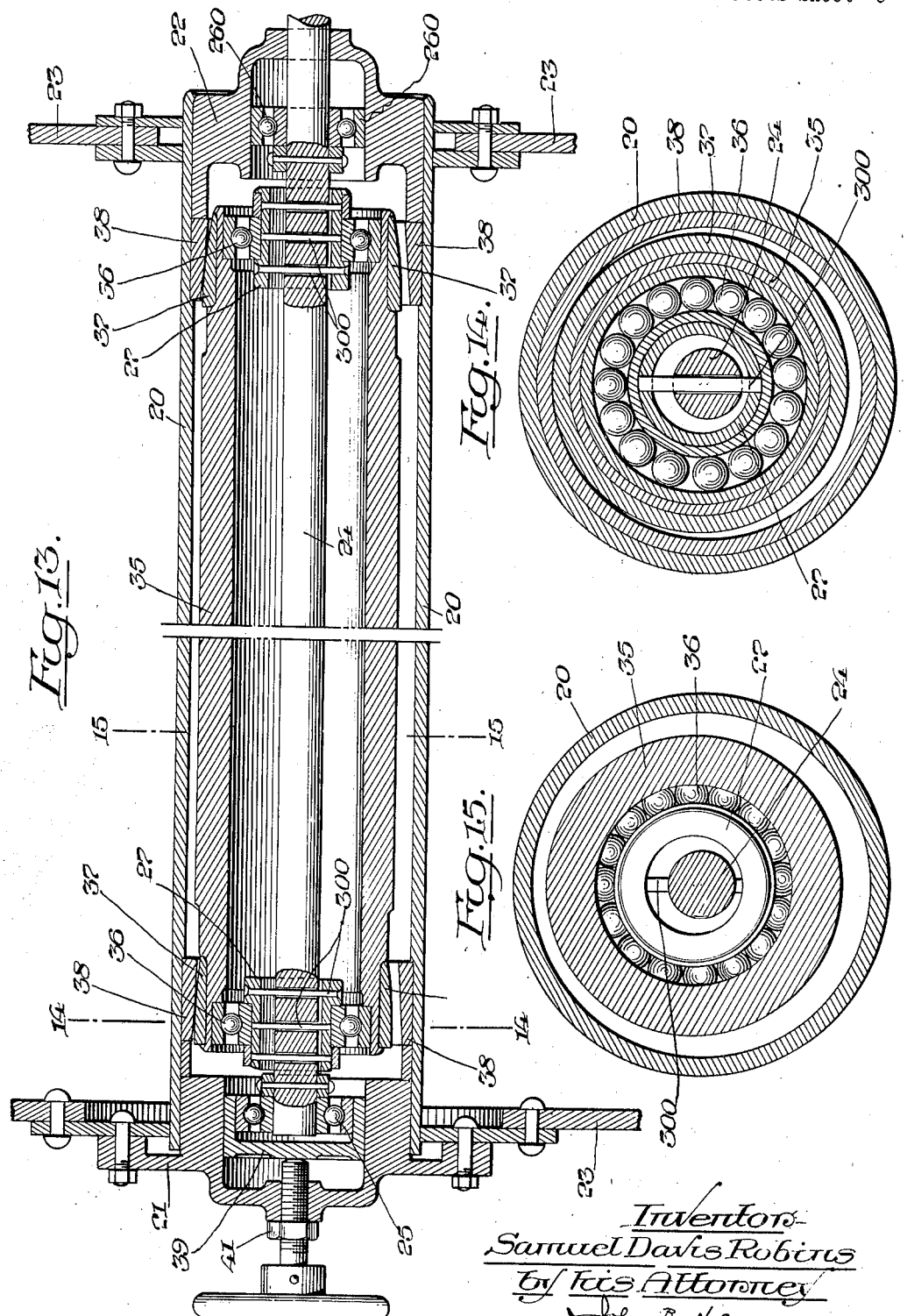

Patented Mar. 14, 1933

1,901,122

UNITED STATES PATENT OFFICE

SAMUEL DAVIS ROBINS, OF HEWLETT, NEW YORK, ASSIGNOR TO ROBINS CONVEYING BELT COMPANY, OF PASSAIC, NEW JERSEY, A CORPORATION OF NEW JERSEY

VIBRATOR FOR SCREENS AND OTHER APPARATUS

Application filed January 6, 1932. Serial No. 585,061.

This invention relates to unbalanced roller vibrators for use in connection with screens and other apparatus, having reference particularly to the type of mechanical vibrators wherein the centrifugal force set up in a gyrating or rotating mass is transmitted as a circular vibratory impulse to a frame or body to be actuated.

Heretofore in vibrators of the type referred to a revolving shaft carrying one or more unbalanced eccentrically located weights were employed, which shaft was journaled in the frame or body to be vibrated. In the operation of a vibrator of this character centrifugal force acting upon the unbalanced rotating element results in a radial pull upon the shaft, which force rotates with the shaft and acts in the direction from the center of gravity of the unbalanced element. Such radial pull is transmitted through the bearings by means of which the shaft is journaled to the body or frame to be vibrated, and therefore the practical efficiency of the apparatus, particularly under relatively heavy radial load and high speed conditions, is largely governed by the character and capacity of the bearings.

With the prior constructions if it were desired to transmit at, say, 2000 R. P. M., a radial impulse of about 2000 pounds, divided between two bearings, ordinary commercial ball or roller bearings, or oil lubricated bushings, could be practically employed; but if it were sought to increase materially the load or speed of the apparatus the cost of proper precision bearings would be prohibitive. Only relatively small ball or roller bearings are suitable for high speed operation in that the peripheral velocity of balls or rollers is a limiting factor and becomes excessive for high speed R. P. M. if they be located on a large diameter circle. Moreover, small ball or roller bearings are necessarily limited to low radial loads at high speeds, unless there be employed a sufficiently large number of such bearings to carry whatever radial load may be desired. This introduces not only a multiplicity of parts with the accompanying complications, but also difficulties arising from aligning the bearings and providing for an equal distribution of the load throughout the series.

Plain bearings in prior vibrators are subject to the limitations corresponding closely to ball or roller bearings; for instance, large diameter journals are incapable of very high speed operation. The rubbing velocity being the fundamental limitation, possible speeds are inversely proportional to journal diameter. Furthermore, with plain bearings only journals which provide a maintenance of oil film are capable of high speed operation.

The principal object of my invention is to provide an unbalanced roller vibrator of simple and efficient construction which will transmit very heavy radial impulses at very high speeds, and in which construction the power transmitting shaft and its bearings are freed from all radial load during the operation of the apparatus, thus permitting the use of inexpensive bearings.

Another object of my invention is to provide a vibrator having provision whereby the amount of centrifugal impulse at any given speed of rotation can be readily varied to meet particular requirements, the adjustment being attainable while the apparatus is in operation.

Another object of my invention is to provide a vibrator so constructed that the centrifugal force set up in the gyrating or rotating mass can be transmitted as a circular or as a flattened circular vibratory impulse with or without in either case an interruption in the orbital path of vibration.

With these and other objects in view my invention comprises a vibrator embodying features of novelty which in a preferred form will be hereinafter described; the scope of the invention then being expressed in the appended claims.

In the drawings—

Figure 1 is a longitudinal vertical section of a vibrator embodying my invention.

Figs. 2 and 3 are transverse vertical sections of the vibrator, as on the lines 2—2 and 3—3, respectively, of Fig. 1.

Fig. 4 is a longitudinal vertical section, as on the line 4—4 of Fig. 1, showing the mounting of a floating eccentric adjacent one end of the shaft and also the damping means therefor.

Figs. 5 and 6 are sectional perspective views of the eccentric and the coupling member therefor adjacent the opposite end of the shaft.

Figure 10:
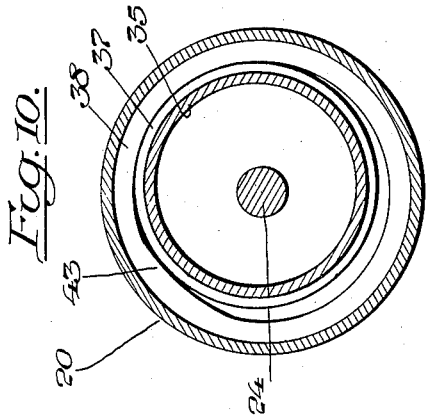

Figs. 7 to 12, inclusive, are sections through the tubular vibratory element and the gyratory mass element showing modifications of the contactual surfaces of the respective elements whereby the orbital path of the vibratory element can be varied.

Fig. 13 is a longitudinal vertical section of a vibrator embodying a modified form of mounting for the eccentric.

Figs. 14 and 15 are transverse vertical sections, as on the lines 14—14 and 15—15, respectively, of Fig. 13.

Referring to Figs. 1 to 6, inclusive, of the drawings, 20 designates a tubular vibratory element comprising a housing of proper diameter and length for its intended purpose, having end heads 21 and 22 operatively associated with the respective members 23 of a structure to be vibrated. In the present instance the head 21 is threaded into one end of the housing, and the head 22 is secured in place by crimping or swaging thereon the opposite end of the housing. Co-axial with the housing is a shaft 24 which is journaled in bearings 25 and 26 in the respective end heads. The shaft 24 extends through and beyond the end head 22 and is adapted to be flexibly connected with and rotated at high speed from a suitable source of power.

In the preferred construction shown in Fig. 1 the bearing 25 is of the ball type while the bearing 26 is a plain bearing; provision being had whereby the bearing 25 and the shaft can be simultaneously adjusted longitudinally of the housing, as and for a purpose hereinafter described.

On the shaft 24, adjacent the inner sides of the respective end heads, are two counterpart bodies comprising annular members 27 which are so coupled to the shaft as to rotate positively therewith, yet are free to assume any eccentric relation within limits to the axis of rotation of the shaft, each member thus constituting a "floating" eccentric.

In the form of coupling shown in Figs. 1, 4, 5 and 6 the outer side of each of the members 27 is provided with an end flange 28 having radial slots 29 which are slidably fitted on radial projections 30 on the adjacent face of a flanged collar 31 fast on the reduced end of the shaft 24. Each member 27 is maintained yieldingly in sliding engagement with the guide collar by means of a compression spring 32 which is interposed between a collar 33 on the shaft and a disc 34 loosely mounted on the shaft against the opposing end of the annular member.

A roller 35 comprising an annular member of any desired mass surrounds the shaft 24 and is slightly smaller in diameter than the interior of the tubular housing. This roller is rotatably mounted at its ends on the respective members 27, suitable antifriction bearings 36, such as the ball type shown, being preferably interposed between the floating eccentrics and the internal wall of the roller.

Fixed on the respective ends of the roller 35, and constituting in effect integral parts thereof, are circumferential race members 37 adapted to co-act with the opposing inner surfaces of similar race members 38 which are fixed within the ends of the tubular housing 20. The outside diameter of each of the members 37 is smaller than the inner diameter of the co-acting member 38, and therefore by virtue of the slidable or floating mounting of the bodies 27 on the shaft 24, a measurable eccentricity is maintained between the mass roller 35 and the shaft during the rapid rotation of the latter, thus producing a gyration of the roller with consequent generation of centrifugal force thereon. This force finds no opposing forces to prevent the outward radial movement of the mass roller and the effective operative contact of its race members 37 with the opposing members 38 of the housing 20. Consequently a continual state of rolling contact is maintained between the mass roller and the housing, and the centrifugal force set up in the roller is transmitted as a circular or orbital vibratory impulse to the housing and the frame or body associated therewith.

By the foregoing described construction and co-operative arrangement of elements it will be seen that the total radial impulse resulting from the centrifugal force acting upon the roller 35 is transmitted directly to the housing 20 through the race members 37 and 38, and since no eccentric mass is radially fixed to the shaft 24, (which itself is concentric throughout the housing 20) no radial load other than the weight or gravity load of the shaft is exerted on the bearings 25 and 26. There being for the same reason no radial pull on the shaft, the shaft is subjected to torsional stress only.

It will also be seen that the spring-pressed discs 34 acting against the opposing ends of the respective floating eccentrics perform the function of damping devices for the rotating mass to prevent its "chattering" when the shaft is stopped or the rotation of the shaft is reduced below the effective operating speed.

It will also be seen that the members 37 and 38 are not only large diametrically as compared with the balls or rollers of the anti-friction bearings in prior vibrators, but that the outside diameter of each of the members 37 is only slightly smaller than the inside diameter of the member 38 with which it contacts. Consequently the area of contact under elastic compression between the co-acting contact members greatly exceeds that of the area of the contact in ball or roller bearings of prior constructions, thus providing for the efficient carrying of exceedingly heavy pressures between such members.

It will further be seen that the co-acting surfaces of the contact members of the mass roller 35 and housing 20 are just as capable of being manufactured with high precision as are the conventional race ways for ball or roller bearings.

In accordance with an object of my invention the amount of centrifugal impulse of the mass roller 35 at any given speed of rotation of the shaft 24 can be adjusted to meet specific requirements while the apparatus is in operation. To this end, the inner surfaces of the contact members 38 are preferably correspondingly tapered as shown, so that in accordance with different longitudinal adjustments of the roller 35 and its contact members 37 variations of the ratio of the outside diameter of each of the members 37 to the inside diameter of the contiguous member 38 at the point of contact can be readily effected. For this purpose the driven end of the shaft 24 is slidably mounted in the bearing 26 in the adjacent head 22 of the housing, and the roller bearing 25 for the other end of the shaft is mounted in a casing 39 which is slidably fitted in a cavity in the end head 21 of the housing. An adjusting screw 40 is threaded in the wall of the head 21 so as to bear centrally against the opposing wall of the casing 39, and hence by properly manipulating the screw 40 the casing and its bearing 25, together with the shaft 24 and its appurtenances, can be adjusted to determine the endwise location of the mass roller 35 and the relative positions of the contact surfaces of the members 37 of the roller with respect to the contact surfaces of the members 38 of the housing, and this while the apparatus is in operation. The screw 40 receives the end thrust of the bearing casing 39 during the rotation of the shaft 24 which thrust is occasioned by the inclined bearing surfaces of the contact members. This screw 40 is provided with a lock nut 41 for securing the parts in the desired position of adjustment.

Figure 7:
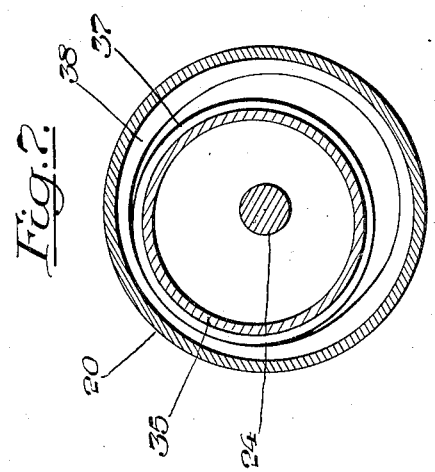
Figure 8:
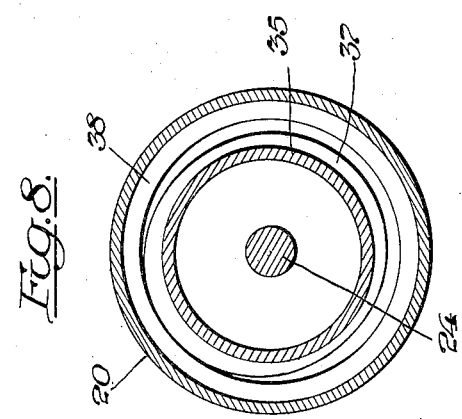

The orbital path of the vibrating housing 20 can be readily varied to meet particular requirements of the screen or other structure associated therewith, for example, if the internal contact surface of the race ring 38 of the housing be slightly elliptical, as represented in Fig. 7, the mass roller in its active gyratory travel in contact with such surface will impart an elliptical path to the housing. So also, if, as represented in Fig. 8, the race ring 37 of the mass roller be slightly elliptical, an elliptical path will be imparted thereby to the housing during the gyratory travel of the roller.

Figure 12:
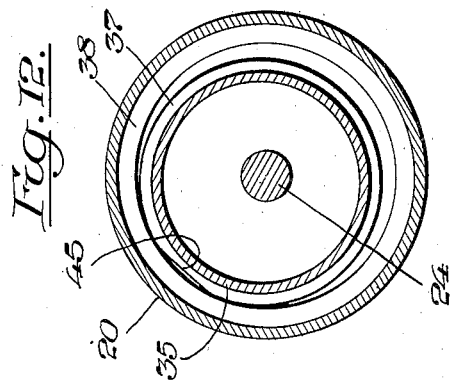
Figure 9:
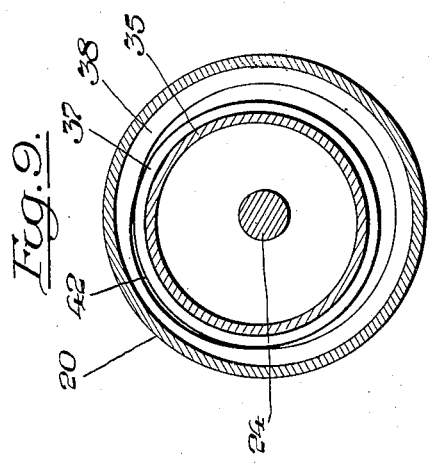
Figure 11:
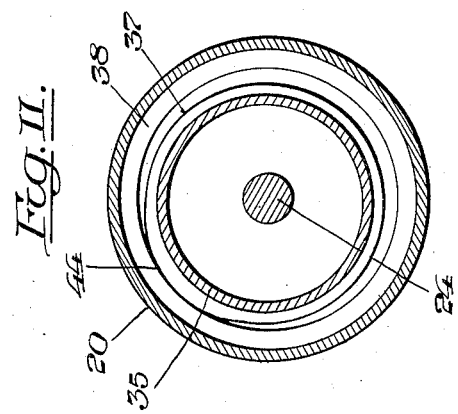

If the continuity of the internal circular contact surface of the race ring 38 of the housing be interrupted by a depression, as indicated at 42 in Fig. 9, or by a raised portion, as indicated at 43 in Fig. 10; or if the race ring 37 of the mass roller be interrupted by a raised portion as at 44 in Fig. 11, or by a depressed or flattened portion as at 45 in Fig. 12, the orbital path of the vibrating housing in each case will be influenced by the opposed impulse or impression during the rotation of the roller, and in consequence periodic jarring effects will be transmitted to the structure to which the vibrator is applied.

In the constructions illustrated in Figs. 7, 9 and 10, it is apparent that the interruptive portion of the race ring 38 of any of the housings can be adjusted to any desired angular position in relation to the axis of the shaft by partially turning the housing on its end heads and then securing it at the desired position of adjustment.

In the modification shown in Figs. 13, 14 and 15 of the drawings, an anti-friction bearing 260, instead of a plain bearing, is provided for the driven end of the shaft, such anti-friction bearing being slidably mounted in a cavity in the adjacent head 22 of the housing, so as to be longitudinally movable with the shaft in accordance with any predetermined adjustment of the mass roller and its rings 37. In this construction the mounting of the floating eccentrics on the shaft 24 is effected by means of diametrically disposed pins 300 which are fixed at their ends in the annular members 27 and are slidably fitted in suitable diametric holes drilled in the shaft.

It is to be understood that my invention is not limited to the specific constructions herein disclosed as the same may be varied within the principle of my invention and the scope of the appended claims.

I claim—

1. A vibrator comprising a vibratory element, a shaft, an annular mass element surrounding said shaft and bodily movable by generated centrifugal force into rolling contact with said vibratory element, an annular element also surrounding the shaft and affording an internal bearing for said mass element, and a connection between said internal bearing element and the shaft whereby the bearing element is positively rotatable with the shaft yet movable in paths transversely of the axis of rotation of the shaft.

2. A vibrator comprising a vibratory element, a shaft, a mass roller surrounding said shaft and bodily movable by generated centrifugal force into rolling contact with said vibratory element, spaced-apart annular elements also surrounding the shaft and affording internal bearings for said roller, and connections between said internal bearing elements and the shaft whereby the bearing elements are positively rotatable with the shaft yet movable in paths transversely of the axis of rotation of the shaft.

3. A vibrator comprising a vibratory element having an internal contact surface, rotatable power transmitting means, a floating eccentric comprising a body surrounding said transmitting means and slidably connected therewith for positive rotation by, and movement transversely of the transmitting means, and a mass element rotatably encircling said eccentric and transversely movable therewith, said mass element having a peripheral contact surface in operative position relative to the contact surface of the said vibratory element.

4. A vibrator comprising a vibratory element having an internal contact surface, a shaft, spaced shaft-bearings carried by the said element, spaced-apart eccentrics comprising supporting bodies surrounding said shaft and slidably connected therewith for positive rotation by, and movement transversely of the shaft, and a mass roller rotatably encircling said bodies and transversely movable therewith, said roller having peripheral contact surfaces in operative position relative to the respective contact surfaces of the said vibratory element.

5. A vibrator comprising a vibratory element having an internal contact surface, a shaft, means including a slidable coupling between said body and shaft, a body surrounding the shaft whereby the body is rotatable with, and movable transversely of the shaft, and a mass element rotatably encircling said body and transversely movable therewith, said mass element having a circumferential contact surface in operative position relative to the contact surface of the vibratory element.

6. A vibrator comprising a vibratory element having an internal contact surface, a shaft, a body surrounding the shaft, means including a slidable coupling between said body and shaft whereby the body is rotatable with, and movable transversely of the shaft, and a mass element rotatably encircling said body and transversely movable therewith, said mass element having a circumferential contact surface in operative position relative to the contact surface of the vibratory element, and damping means between said shaft and body.

7. A vibrator comprising a vibratory element having an internal contact surface, a shaft, a mass roller surrounding the shaft and having a circumferential contact surface in operative position relative to the contact surface of the vibratory element, a body surrounding said shaft and rotatably supporting the roller, a coupling between one side of said body and the shaft including slidable interlocking means on said shaft and body, whereby the body is rotatable with, and movable transversely of the shaft, a pressure member, and a spring urging said member against the other side of said body.

8. A vibrator comprising a vibratory element having an internal contact surface, a shaft, an annular body surrounding said shaft, pins fixed to said body and slidably fitted in diametric holes in the shaft whereby said body is positively rotatable by, yet movable transversely of the shaft, and a mass element rotatably encircling said body and transversely movable therewith, said mass element having a peripheral contact surface in operative position relative to the contact surface of the vibratory element.

9. A vibrator having rotatable power transmitting means, a floating eccentric comprising a body which encircles the said transmitting means and is slidably connected therewith for positive rotation by, and also movement transversely of the shaft, and a mass element rotatably encircling said body and transversely movable therewith.

10. A vibrator comprising a vibratory tubular element having central shaft bearings, a shaft journaled in said bearings, a mass roller surrounding the shaft and spaced therefrom, an eccentric rotatable by said shaft and movable in a path transversely of the axis of rotation of the shaft, and anti-friction bearings between said eccentric and the roller.

11. A vibrator comprising a vibratory tubular element having an internal contact surface, a shaft, a hollow mass roller surrounding said shaft and having a circumferential contact surface, and operative connections between said roller and shaft whereby the roller is bodily movable by generated centrifugal force to position its contact surface in rolling contact with the contact surface of the vibratory element, one of the contact surfaces having a path interruptive portion with which the other contact surface co-acts.

12. A vibrator having a vibratory element including an internal inclined contact surface, a shaft, and an internal gyratory mass roller having a circumferential contact surface in co-operative relation to the contact surface of the vibratory element, operative connection between said roller and the shaft whereby the roller is movable by generated centrifugal force to position its contact surface in rolling contact with the internal contact surface of the vibratory element, and means for shifting said roller longitudinally of its axis to vary the co-operative contactual relation of the opposing contact surfaces.

13. A vibrator comprising a vibratory tubular element having central shaft bearings and having an internal contact portion, a shaft journaled in said bearings, a mass element surrounding said shaft and spaced therefrom, said latter element having a circumferential contact portion in operative position relative to the contact portion of the tubular element, one of said contact portions being inclined in relation to the other, an element rotatable by said shaft and movable in a path transversely of the axis of rotation of the shaft, said eccentric affording an internal bearing for the mass element, and manually operative means for effecting relative longitudinal adjustment of said roller to vary the contactual relation of said contact portions.

14. A vibrator comprising a vibratory element having an internal contact portion, rotatable power transmitting means, a floating eccentric comprising a body surrounding said transmitting means and slidably connected therewith for positive rotation by, and movement transversely of the transmitting means, a mass element rotatably encircling said eccentric and transversely movable therewith, said mass element having a peripheral contact portion in operative position relative to the contact portion of the said vibratory element, one of said contact portions being inclined in relation to the other, and means at one end of the vibratory element for effecting relative longitudinal adjustment of said roller to vary the contactual relation of said contact portions.

15. A vibrator comprising a vibratory element including a race member, a shaft, a mass roller surrounding said shaft and including a race member, said race members having relatively inclined co-acting surfaces, an element providing an internal bearing for said roller, a connection between said bearing element and the shaft whereby the bearing element is positively rotatable with the shaft yet is movable in paths transversely of the axis of rotation of the shaft, and means at one end of the vibratory element for longitudinally adjusting said shaft and its appurtenances, including the roller, whereby co-operative contactual relation of the said race members can be varied.

16. A vibrator comprising a vibratory element including a race member, a shaft, a bearing for said shaft slidably mounted in the vibrator, a mass roller surrounding said shaft and including a race member, said race members having relatively inclined co-acting surfaces, an element providing an internal bearing for said roller, connections between said bearing element and the shaft whereby said bearing element is positively rotatable with the shaft yet is movable in paths transversely of the axis of rotation of the shaft, and exteriorly projecting adjusting means mounted in one end of the said vibratory element in co-operative relation to the slidable shaft bearing whereby said bearing, the shaft and its appurtenances, including the roller, can be longitudinally adjusted to vary the co-operative contactual relation of the said race members.

Signed at New York, in the county and State of New York this 4th day of January, A. D. 1932.

SAMUEL DAVIS ROBINS.